（12） United States Patent
Okabayashi et al.

(10) Patent No.: US 6,181,424 B1
(45) Date of Patent: Jan. 30, 2001

(54) THREE-DIMENSIONAL MEASUREMENT APPARATUS

(76) Inventors: Mitsumasa Okabayashi; Sumio Goto; Masaru Saito, all of c/o Juki Corporation 8-2-1, Kokuryo-Cho, Chofu-Shi Tokyo 182 (JP)

( * ) Notice: Under 35 U.S.C. 154(b), the term of this patent shall be extended for 0 days.

(21) Appl. No.: 09/211,770

(22) Filed: Dec. 15, 1998

(30) Foreign Application Priority Data

Dec. 19, 1997 (JP) .................................... 9-350301

(51) Int. Cl.$^7$ .................................... G01B 11/24
(52) U.S. Cl. .................... 356/376; 356/380; 356/379; 356/372
(58) Field of Search .................... 356/376, 372, 356/373, 375, 379, 380, 383, 384

(56) References Cited

U.S. PATENT DOCUMENTS 5,028,799 * 7/1991 Chen et al. .................... 356/376

FOREIGN PATENT DOCUMENTS 62-299706  12/1987 (JP) .
7-26825    3/1995 (JP) .

* cited by examiner

Primary Examiner—Frank G. Font
Assistant Examiner—Roy M. Punnoose

(57) ABSTRACT

A three-dimensional measurement apparatus for measuring three-dimensional information of an object with high speed and high accuracy is disclosed. A laser light is converted to a collimated light, which forms a stripe of light on an object through a projection unit. The projection unit is moved back and forth by a linear motor along the collimated light in a direction perpendicular to the longitudinal direction of the stripe of light. Since the projection unit projects a light stripe of constant width on the object with constant reception of the collimated light, a plurality of stripes of light can be formed on the object by means of simple movement of the projection unit. The area on the object scanned by the plurality of stripes of light is captured by a CCD camera, and three-dimensional information is measured using the light-section method.

35 Claims, 7 Drawing Sheets

THREE-DIMENSIONAL MEASUREMENT APPARATUS

BACKGROUND OF THE INVENTION

1. Field of the Invention

The present invention relates to a three-dimensional measurement apparatus, and more particularly to an apparatus for use in a solder paste printing machine and the like for an electronic component surface mounting system.

2. Description of the Related Art

On a printed circuit board to which electronic components are mounted, a solder paste pattern is generally printed for forming a conductor between the components and a wired pattern on the board. For measuring the shapes of the printed paste, three-dimensional measurement using the "light-section method" is widely applied. In the light-section method, an object (for example, solder paste) is irradiated by a stripe of light so as to section the surface thereof, and measure the shape or unevenness of the surface thereof from intersected lines on the surface. One example is shown in FIG. 8.

Referring to FIG. 8, laser light emitted from a laser diode 21 is focused through an aspheric focusing lens 22 on the vicinity of an object 28 as a beam spot of 0.2 mm in diameter. The laser light passing through the focusing lens 22 is reflected by a galvano mirror 23 disposed in the midst of light path, passes through a semi-transparent mirror 24, and is projected on the object 28. As a galvano mirror 23, driven by a driver (not shown) oscillates as indicated by an arrow in FIG. 8, the beam spot is scanned substantially in a line on the surface of object 28, thereby forming a stripe of light necessary for the light-section method.

The scanned light is also reflected off the semi-transparent mirror 24 and directed to a position sensitive device (PSD) 25, which detects a position in the scanning direction (X-axis) based on the rotating angle of the mirror 23. Simultaneously, the reflected light from the object surface is focused on a PSD 27 provided for detecting a position in the vertical direction (Z-axis) through a receiving lens 26 disposed at an angle of between 18 and 30 degrees with the projected light axis. The spot position focused on the PSD 27 changes depending on the height of the object and can be taken out as a voltage change, thereby providing a measurement of the unevenness (position in the Z-axis) of the surface of the object 28. With the repetition of abovementioned measuring method according to the movement of the whole measurement apparatus in a direction (Y-axis) perpendicular to the optical scanning direction, three-dimensional positions of the object 28 are measured.

In the foregoing three-dimensional measurement method, PSDs are used for detecting scanned positions. However, since PSDs do not have good voltage linearity characteristics, the detected positions must be corrected based on the calculation of characteristics of each PSD to be used. Another problem with the conventional PSDs is that because a change of the center of gravity of the focused spot on PSD is taken out when measuring height by PSDs, spot luminance related data is not obtainable. Also, PSD characteristics change depending on temperature, so it is difficult to measure accurate height.

Another problem arises in the conventional three-dimensional measurement method. Since the optical path length between the aspheric focusing lens and the object is long, which means a small numerical aperture (N.A.), and the laser light can not be focused to a small diameter, it is difficult to obtain a highly accurate measurement result.

Still another problem arises in the conventional three-dimensional measurement method. Since the whole measurement apparatus must be moved in a direction perpendicular to the longitudinal direction of the stripe of light every time the stripe of light is cast for the measurement of the whole surface of the object, a driving device for movement of the apparatus would be on a large scale, and thereby vibration would occur during movement. Consequently, accurate measurement is difficult.

Thus, as demonstrated by the foregoing problems, there exists a need for a three-dimensional measurement apparatus for measuring three-dimensional positions of an object with high accuracy and high speed.

SUMMARY OF THE INVENTION

In order to solve the problems mentioned above, the invention provides a three-dimensional measurement apparatus for measuring three-dimensional information of an object based on a light-section method, which utilizes irradiation of a stripe of light on the object. In an apparatus aspect of the invention, the invention includes a laser light source, means for collimating the laser light emitted from the laser light source, a projection unit for projecting the stripe of light on the object from the collimated laser light, means for moving the projection unit along the collimated light, and parallel therewith (so that the stripe of light moves on the object perpendicular to a longitudinal direction thereof), and an imaging means for capturing images of the object, which are scanned with the movement of the stripe of light, at given angles with the axis of the projected light, whereby three-dimensional information of the object is obtained from the captured images of the object.

With this arrangement, the collimated laser light is converted to a stripe of light to irradiate the object, and the projection unit projecting the stripe of light moves back and forth along the collimated light in the direction perpendicular to the longitudinal direction of the stripe of light. Because the projection unit radiates a stripe having a constant width of stripe of light on the object with constant reception of the collimated light, a plurality of stripes of light can be formed on the object by means of simple movement of the projection unit. As a result, three-dimensional measurement based on the light-section method can be attained with high speed and high accuracy.

BRIEF DESCRIPTION OF THE DRAWINGS

The invention will be more clearly described by way of reference to the accompanying drawings, wherein.

DETAILED DESCRIPTION OF THE DRAWINGS

Embodiments of the invention will be described in detail with reference to the accompanying drawings.

Figure 1:
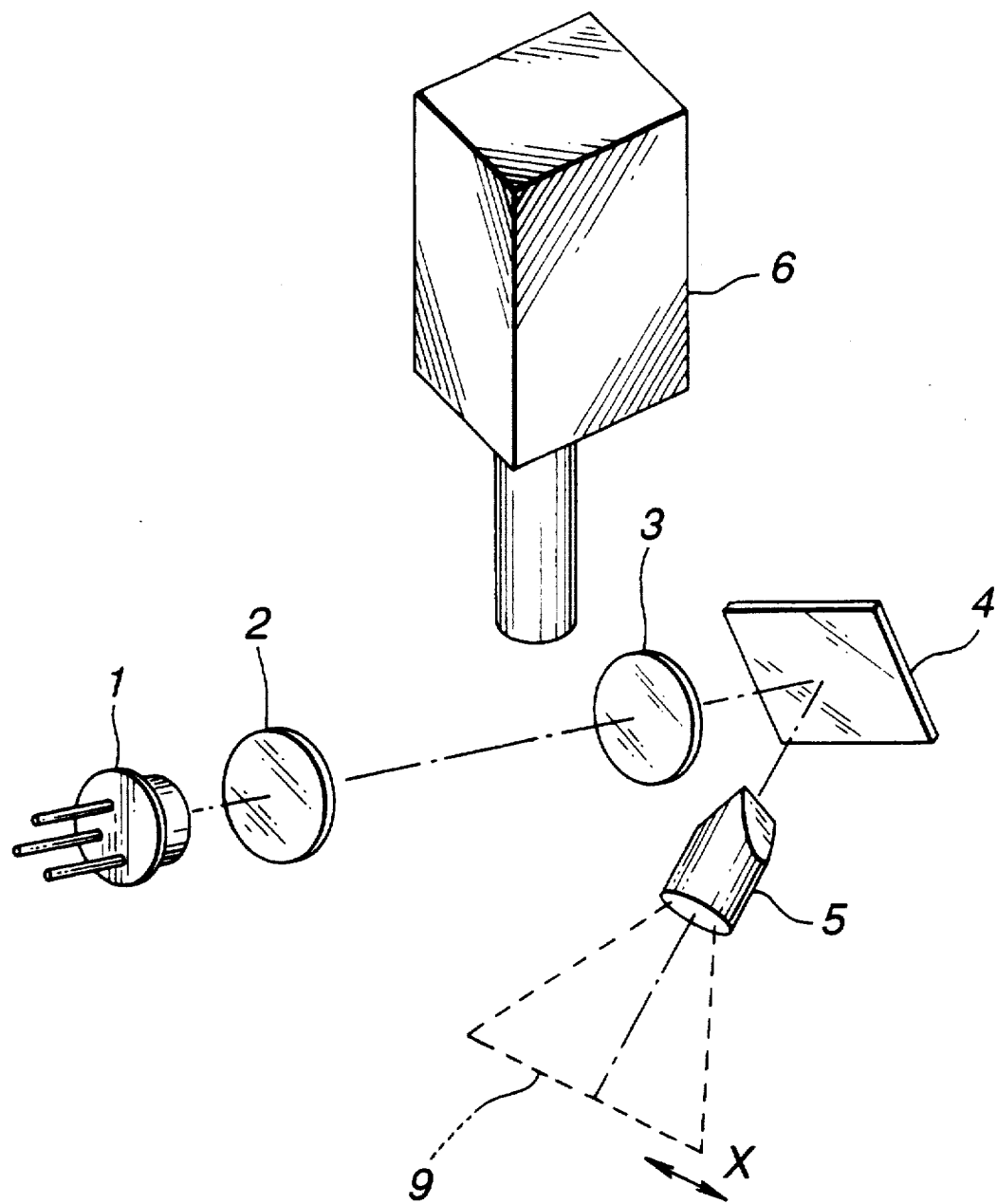
FIG. 1 is a perspective view of illustrating an optical arrangement of three-dimensional measurement apparatus, one embodiment of the invention.
Figure 2:
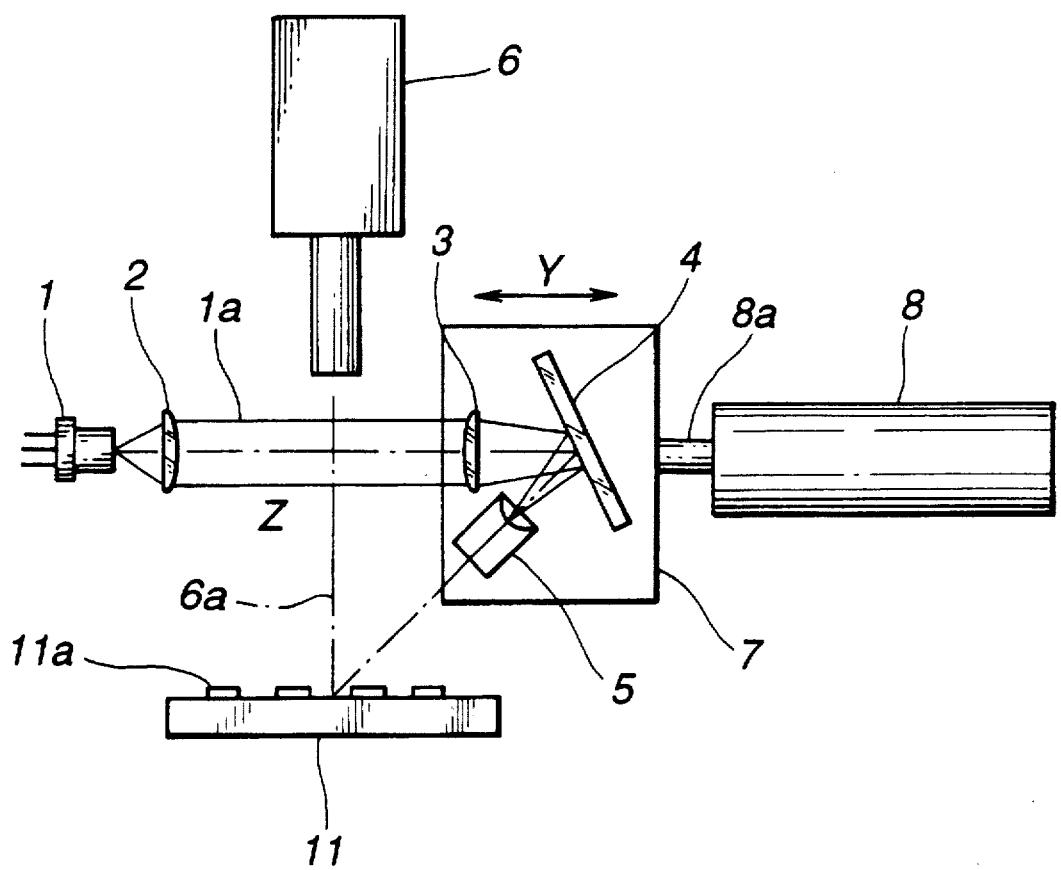
FIG. 2 is a side view of FIG. 1.

FIG. 1 shows an arrangement of main optical parts embodying a form of three-dimensional measurement apparatus of the invention, and FIG. 2 is a side view of FIG. 1. Laser light emitted from a laser diode 1 is collimated by a collimating lens 2 into collimated light 1a in parallel with its optical center axis. The collimated laser light 1a is incident on a projection unit 7 that includes a focusing lens 3, projection mirror 4 and a line generator lens 5. The laser light 1a is focused to a spot of light through the focusing lens 3, reflected by the projection mirror 4 at an angle of 45° with a vertical axis (Z-direction), converted by the line generator lens 5 to a stripe of light 9, which is 14–20 μm wide and 10 mm long, and forms the stripe of light 9 in the X-direction on an object 11.

The light scattered and reflected from the object 11 is imaged on an image capture device. Specifically, the light is imaged on a non-interlace type CCD camera 6, which has a view field of 6 mm by 6 mm and is disposed so that its optical axis 6a is vertical (Z-direction).

The projection unit 7 is coupled to a mover capable of translational movement. More particularly, the projection unit 7, attached to a shaft 8a of a linear motor 8 which linearly moves in the Y-direction with a stroke of about 10 mm, moves back and forth along the collimated light 1a as indicated by an arrow Y in FIG. 2. With this movement of the projection unit 7, the stripe of light 9 moves perpendicular to its longitudinal direction (X-direction).

Figure 3:
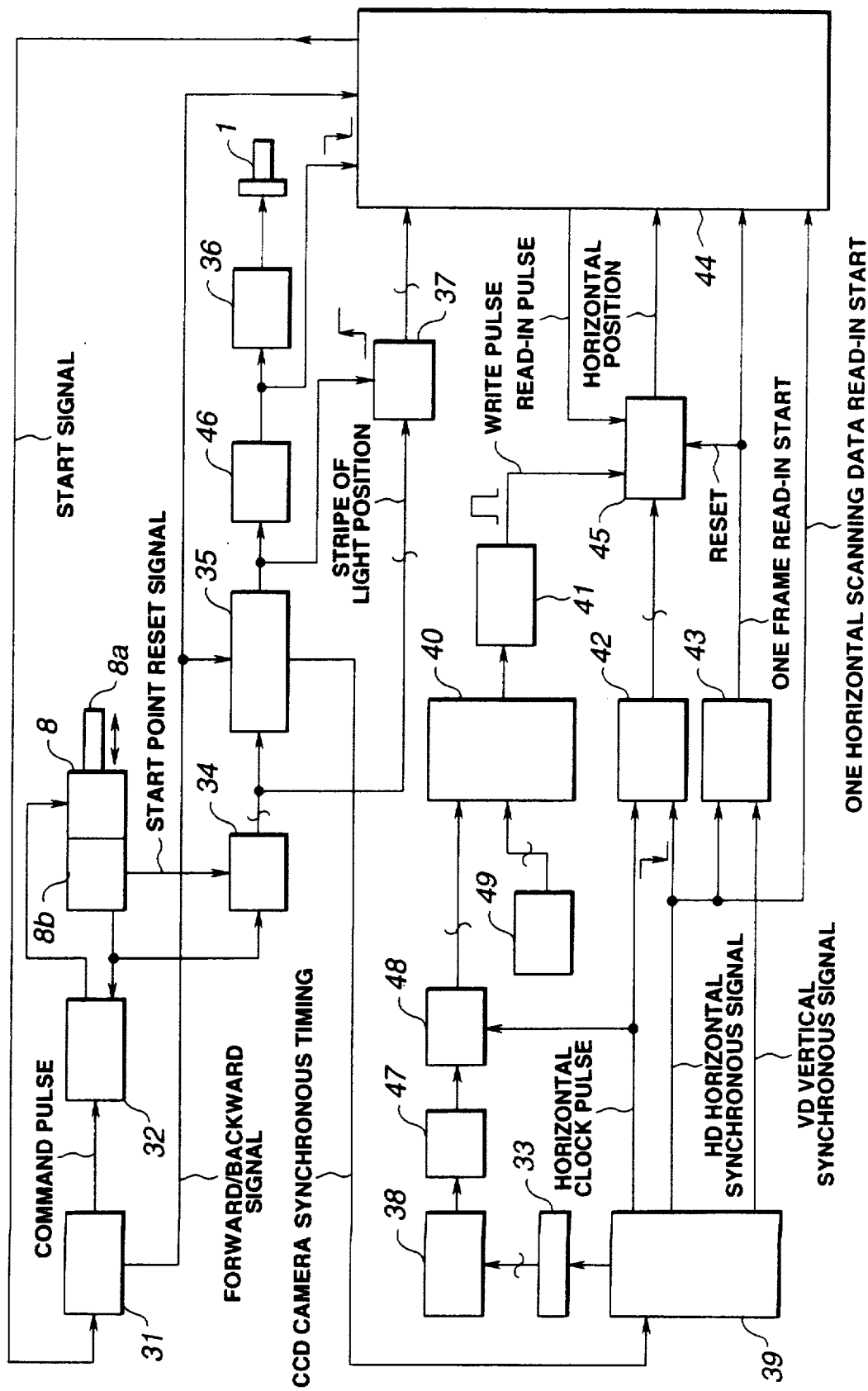
FIG. 3 is a block diagram of electronic circuit elements of an embodiment of the invention.

FIG. 3 is a block diagram of illustrative circuit elements of one embodiment of the invention. In this embodiment, a linear motor drive command generator 31 receives a start signal from CPU 44, outputs a command pulse train for driving the linear motor to a linear motor driver 32, and causes the linear motor 8 to be moved by 0.25 μm per pulse. The command generator 31 simultaneously sends a forward/backward signal to a LD (laser diode) ON/CCD trigger timing decoder 35 (hereafter "timing decoder") for commanding the linear motor 8 whether to move forward or backward.

The linear motor driver 32 drives the linear motor 8 by receiving the command pulse train, and also adjusts a supply voltage to the linear motor 8 by receiving a feed-backed position signal, which represents an actual position of the motor, from a position encoder 8b built within the linear motor 8.

A position counter 34 receives phase A and phase B signals, which differ by 90 degrees from each other, from the position encoder 8b, and outputs a digital position signal indicating the position of the linear motor 8. The position counter 34 is reset by the starting point reset signal from the position encoder 8b.

The timing decoder 35 receives position signals from the position counter 34, and outputs LD ON timing signal (pitch 160 μm). At the rising edge of the timing signal, one-shot multi-vibrator (MS) 46 is triggered to output a 2 ms width of LD ON pulse to a laser diode driver 36, which turns on the laser diode 1 and causes it to emit a single light pulse. The laser diode 1 has a built-in light intensity monitoring photo-diode (not shown), by which light intensity of the laser diode 1 is constantly controlled.

Because the linear motor 8 moves during LD ON timing, compensation for the displacement of the stripe of light position in moving direction is needed. Also, the moving distance differs between the forward and backward movement by a half pitch (80 μm in this embodiment). Therefore, the forward/backward signal from the command generator 31 is applied to control the above displacements.

A position latch 37 latches the position data output from the position counter 34 at the rising edge of LD ON timing, and transmits the Y-directional position of the stripe of light in synchronism with the falling edge of the LD ON pulse from MS 46. The displacement of the actual position of the stripe of light during the movement thereof is compensated for in the CPU 44 depending on the moving speed of the stripe of light, the LD ON time and the forward/backward signal.

A synchronous signal timing generator 39 receives a CCD camera synchronous timing signal from the timing decoder 35, and outputs HD horizontal synchronous signal and VD vertical synchronous signal synchronized with the VD. Relating to the VD vertical synchronous signal, intensity level of each pixel of previous frame begins to be read out. At the same time, each pixel begins to store the respective intensity level, and an image by the scanned stripes of light (4 lines in the embodiment) is obtained on a CCD area image sensor 38 within the camera 6.

The image on the image sensor 38 is read out as an intensity level of each pixel (as an analog value) by a driver 33 in synchronism with vertical and horizontal register transfer clock pulses sent from the timing generator 39, and so on. These output signals are sent to A/D converter 48 via amplifier 47 and the output digitized data is input to comparator 40, where the digitized data is compared with a threshold value 49 and binarized. Incidentally, a sample-and-hold timing during the A/D conversion is applied by the horizontal register transfer clock, and input level at the clock pulses are held and converted to digital data.

A rising/falling edge detector 41 receives the binarized light intensity data form the comparator 40, and outputs pulses synchronized with the rising and falling edges of the data. These output pulses are input to FIFO memory 45 as write pulses, and horizontal addresses sent from a horizontal address counter 42 are stored at the rising and falling edges of the write pulses. The horizontal address counter 42 is reset by the falling edge of the HD horizontal synchronous signal from the timing generator 39, thereafter counts horizontal clock pulses and outputs present horizontal position.

An effective horizontal scanning section detector 43 is reset by the VD vertical synchronous signal, counts the HD horizontal synchronous signals, and outputs a horizontal scanning section signal corresponding to the effective pixel portion on the CCD area image sensor 38. This section signal makes effective the writing into the FIFO memory 45.

The CPU 44 starts to read-in the light spot position data for one frame at the output timing of the effective horizontal section detecting signal. That is, by the HD horizontal synchronous signal, the light spot data during a first effective horizontal scan are written into the FIFO memory 45; thereafter, the data in the FIFO memory 45 are read into the CPU at the start of a next horizontal scan. This process is repeated by the number of the effective horizontal scans.

The CPU 44 calculates height data in each scanned line for one frame, comparing the light spot position data obtained as described above with reference values.

The manner of operation of the apparatus arranged as described above will now be explained below.

The CPU 44 sends a start signal to the linear motor drive command generator 31, which causes the linear motor 8 to move to a predetermined position. Upon reaching this predetermined position, the timing decoder 35 driven by the position counter 34 creates the LD ON signal, which turns on the laser diode 1.

The laser light emitted from the diode 1 is condensed by the collimating lens 2 to a collimated light 1a parallel with the optical center axis, and focused to a light spot by the focusing lens 3. This laser spot light is reflected by the projection mirror 4 at an angle of 45° with the incident light, and directed to the line generator 5. The line generator 5 extends the laser spot light by a prism effect in one direction (X-direction) and forms on the object the stripe of light 9, which is 14 μm wide and 10 mm long.

The linear motor 8 moves in Y-direction at the constant speed of 4.8 mm/sec depending on the signal from the command generator 31, thereby the projection unit 7 connected with the linear motor shaft 8a is moved in Y-direction linearly in parallel with the collimated light 1a. Since the focusing lens 3 always receives the collimated light 1a while the projection unit 7 moves back and forth along the parallel light, focusing function by the lens 3 is not affected, and can be always formed the constant width of stripe of light 9 on the object 11.

When the linear motor 8 reaches a new position, the laser diode 1 is turned on by the timing signal from the timing decoder 35, and emits an impulse light pulse, forming a like stripe of light 9 on the object 11, and a plurality of stripes of light are repeatedly formed according to the movement of the linear motor. These stripes of light are repeatedly formed in the direction (Y-direction) perpendicular to the longitudinal direction of each stripe of light (X-direction).

The diffused and reflected light from the object 11 scanned by the plurality of stripes of light as described above, are imaged on the non-interlace type CCD camera 6, which has a view field of 6 mm by 6 mm and is disposed above the object 11. The area on the object scanned by 4 stripes of light constitutes one frame of image on the CCD camera 6 in this embodiment.

Every time the linear motor 8 moves by a predetermined distance, the CCD camera synchronous timing signal from the timing decoder 35 is input to the timing generator 39, which outputs the VD vertical synchronous signal synchronized with the HD horizontal synchronous signal. The light intensity data of each pixel in the previous frame on the image sensor 38 starts to be read out in synchronism with the VD vertical synchronous signal. At the same time, the image sensor 38 starts to store light intensity data of each pixel on the next frame of image (4 lines of stripes of light).

The data of each pixel read out from the image sensor 38 are amplified, converted from analog to digital, binarized by the comparator 40, and the horizontal addresses corresponding to the pixels above the threshold value 49 are stored in the FIFO memory 45 when the effective horizontal scanning term is detected by the scanning section detector 43. This process is repeated by the number of horizontal scans, thereby the horizontal addresses for the pixels above the threshold value on one frame are stored in the FIFO memory 45.

The CPU 44 starts to read-in the light spot position data for one frame at the output timing of the effective horizontal section detecting signal. The light spot data are written into the FIFO memory 45 by the first effective horizontal scan. Thereafter, the data in the FIFO memory 45 are read into the CPU at the start of the next horizontal scan and simultaneously the light spot data during the next effective horizontal scanning are written into the FIFO memory 45. This process is repeated by the number of the effective horizontal scans, and one frame of data is read into the CPU.

The CPU 44 calculates for each line the differences between the reference value and the data at the light spot positions of one frame obtained as described above. These differences correspond to the height data.

Figure 4:
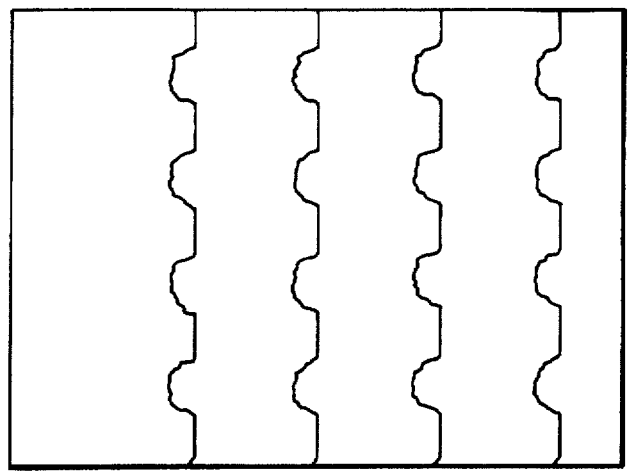
FIG. 4 is an image of an object obtained by CCD camera.

When the object 11 is, for instance, a circuit board in FIG. 2, on which solder paste 11a is printed for conducting electronic components to wired pattern, the image of one frame obtained as described above is shown in FIG. 4, where portions protruded to the left represent the solder paste portions.

After the linear motor 8 moves in one direction by a predetermined distance (about 10 mm), the motor 8 then moves back to the reverse side. Taking the same process as in the forward movement described above, height data of one frame are obtained.

Since the linear motor 8 moves on while the diode 1 is turned on, the CPU 44 compensates for the displacement of the stripe of light caused by the forward and backward movement. Also, driving timing for the linear motor shifts by a half pitch (80 μm in the embodiment) according to the direction.

Figure 5:
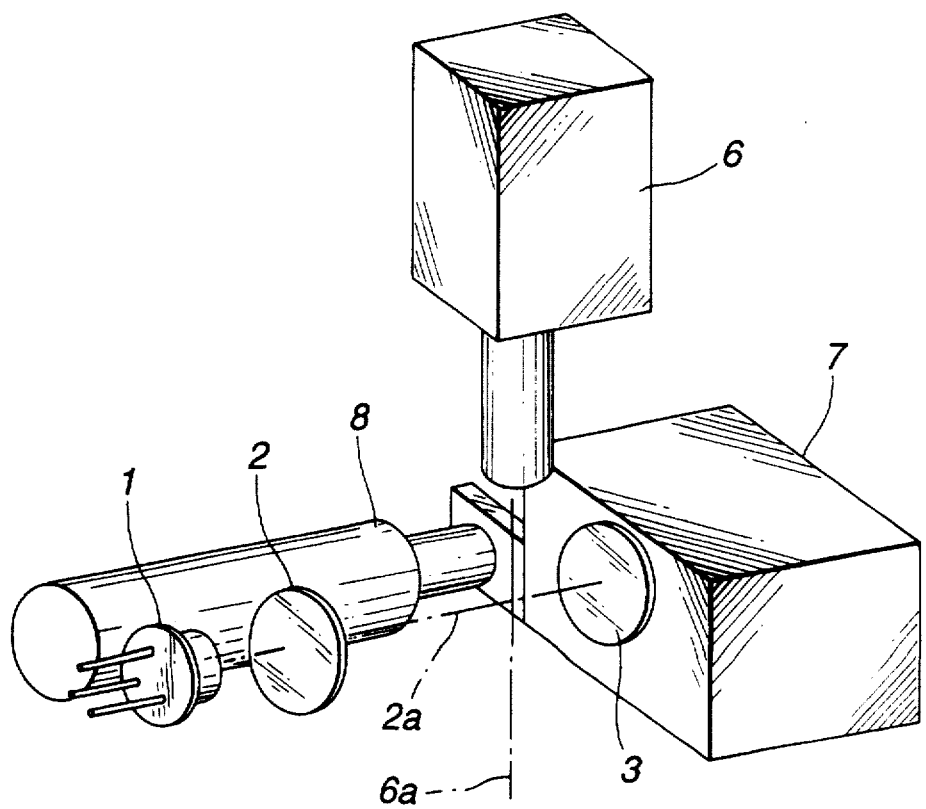
FIG. 5 is a perspective view of an optical arrangement of another embodiment of the invention.

Another arrangement of the invention is shown in FIG. 5. While the linear motor 8 is disposed at the right side of the projection unit 7 in FIG. 2, the linear motor 8 is disposed at the same side as of the light source in such a manner that the movement axis of the linear motor is parallel with the optical axis 2a of the collimated light passed through the collimating lens 2. With this arrangement, the overall width of the apparatus can be smaller. The CCD camera 6 can also be disposed within this overall width by arranging that the light receiving axis 6a is perpendicular to the optical axis 2a of the collimated light, as in FIG. 2.

Figure 6:
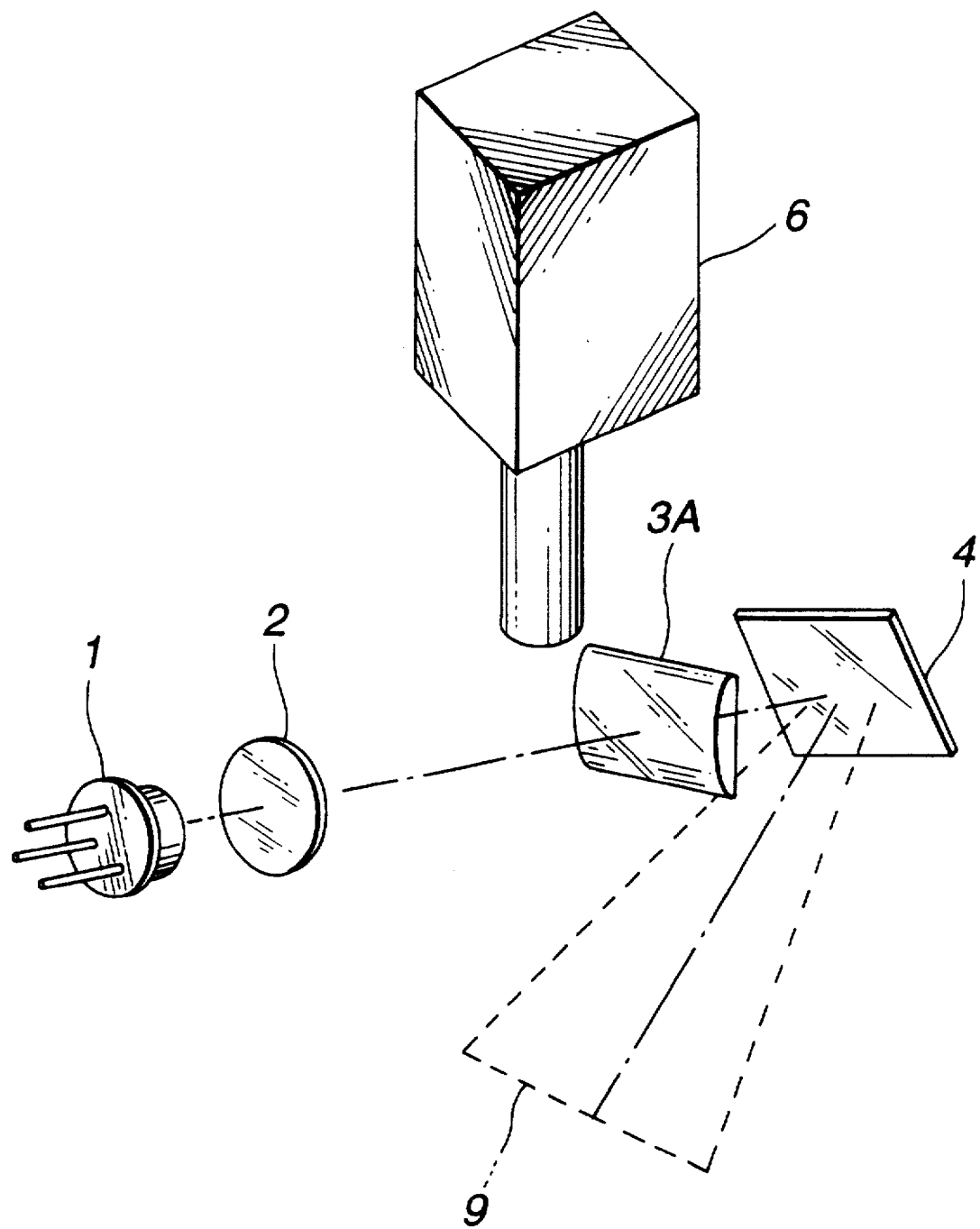
FIG. 6 is a perspective view of an optical arrangement of further embodiment of the invention.

A further embodiment of the invention is shown in FIG. 6. In this embodiment, a cylindrical lens 3A is employed instead of the focusing lens 3, eliminating the line generator 5. If necessary, a beam expander can be disposed close to the collimating lens 2 between the cylindrical lens 3A and the collimating lens 2.

The laser light emitted from the laser diode 1 is collimated through the collimating lens 2, and incident to the cylindrical lens 3A to form a stripe of parallel light, which is reflected off the projection mirror 4 at an angle of 45° with the incident light and forms a stripe of light 9 on the object 11.

Figure 7:
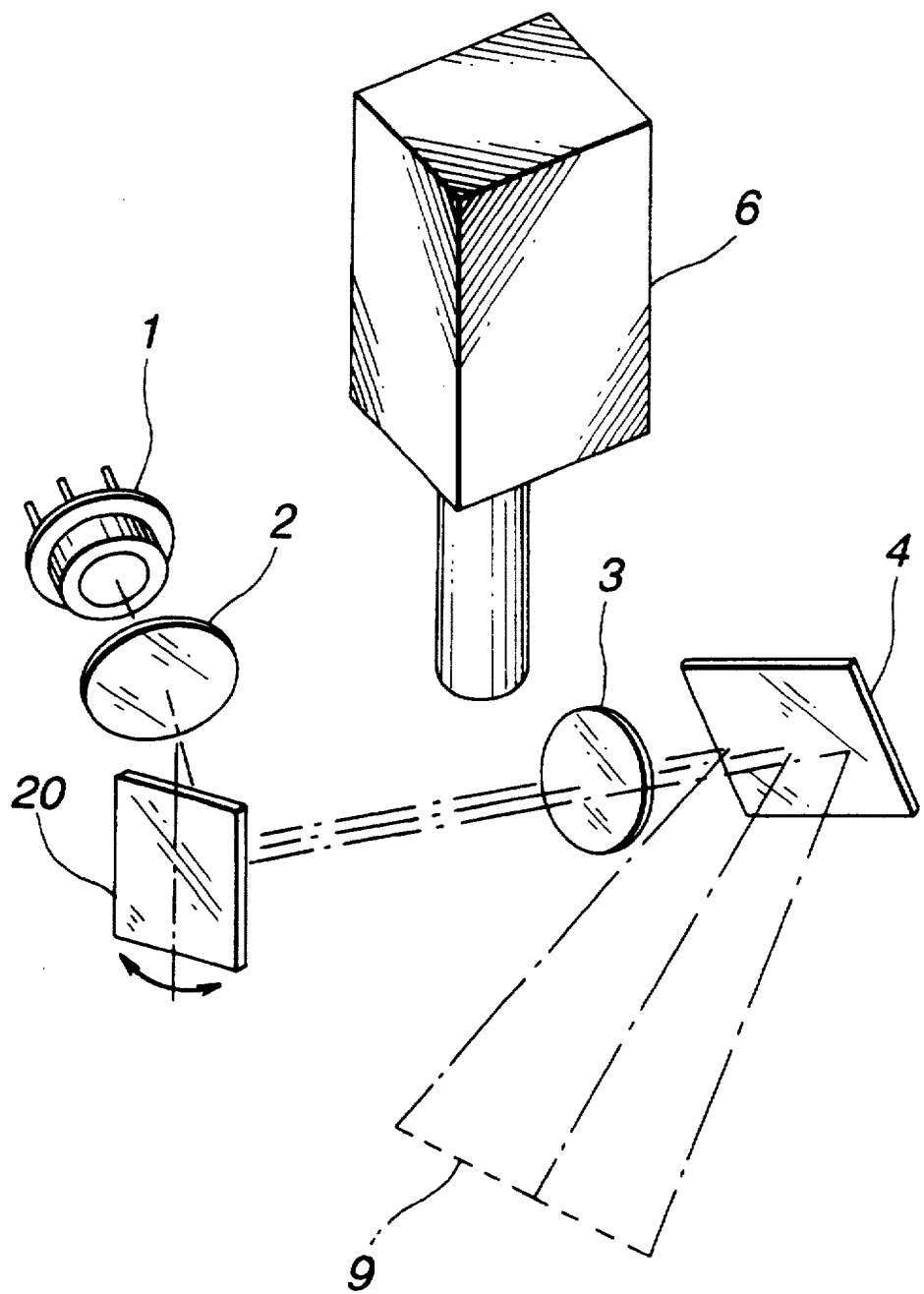
FIG. 7 is a perspective view of an optical arrangement of still another embodiment of the invention.
Figure 8:
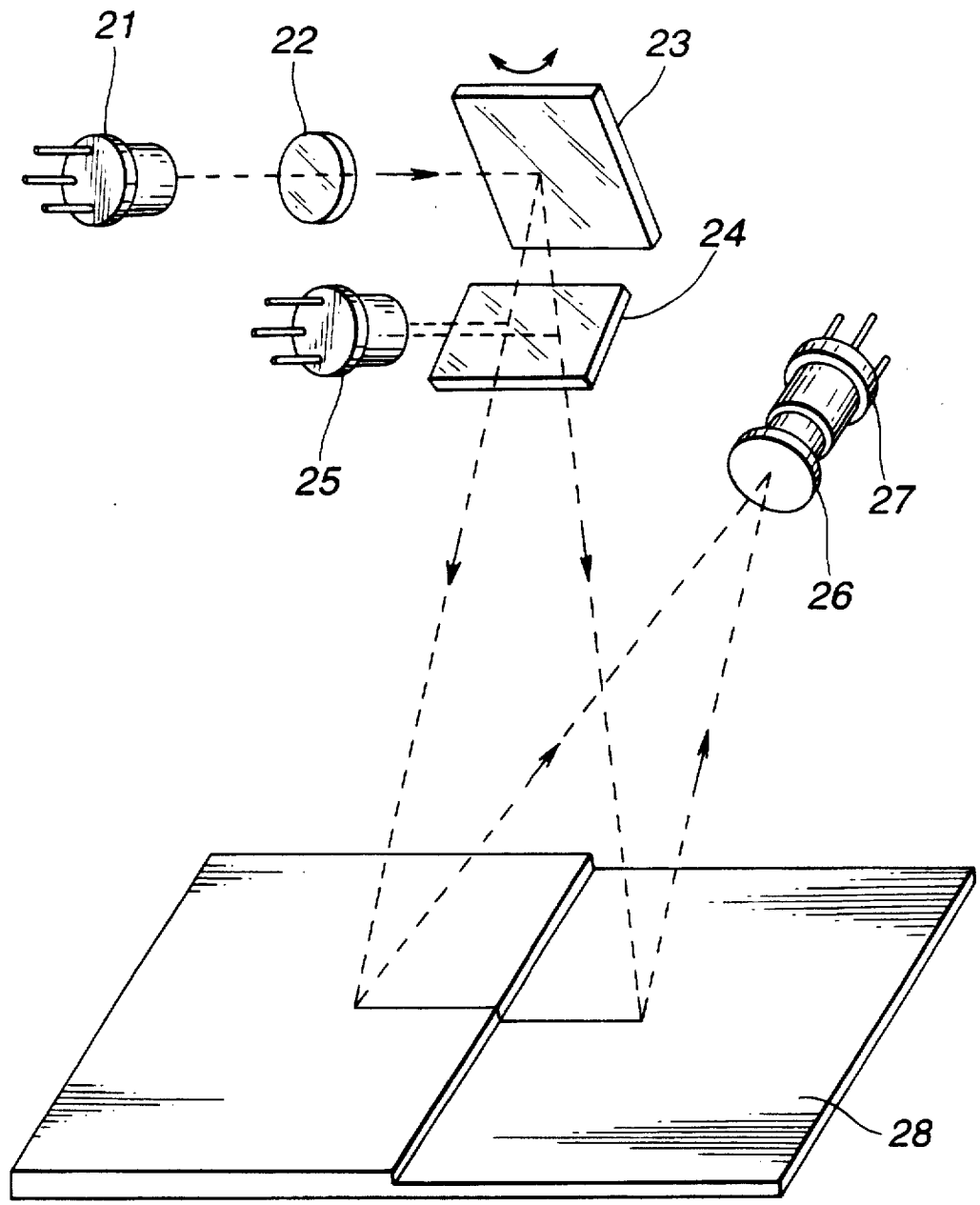
FIG. 8 is a perspective view of an optical arrangement of a conventional two-dimensional measurement apparatus.

FIG. 7 shows still another embodiment of the invention, where a galvano mirror 20 is employed for swinging the collimated laser light at a given angle. The laser light from the laser diode 1 is condensed to a relatively small area of collimated light on the galvano mirror 20, which swings left and right, the collimated light remaining within a effective diameter range of the focusing lens 3. The laser light incident on the projection mirror 4 is reflected off at an angle of 45° to irradiate the object. With the oscillation of the galvano mirror 2 at about 30 Hz, a like stripe of light 9 is formed.

In the embodiments shown in FIGS. 6 and 7, the elements and functions are the same as in the embodiments shown in FIGS. 1 and 2 except for the portions described above.

The invention can be practiced in such modified manner for each embodiment that the laser light irradiates the object from just above, and the CCD camera 6 is disposed at a given angle. In this case, the received image must be corrected depending on the optical path length, and a correction lens (not shown) within the camera 6 needs to have a perspective compensation function.

Collimated laser light is converted to a stripe of light to irradiate the object, and the projection unit projecting the stripe of light moves back and forth along the collimated light in the direction perpendicular to the longitudinal direction of the stripe of light. Since the projection unit radiates a constant width of stripe of light on the object with constant reception of the collimated light, a plurality of stripes of light can be formed on the object by means of simple movement of the projection unit. Thereby, three-dimensional measurement based on the light-section method can be attained with high speed and high accuracy.

The present invention has been described with respect to particular illustrative embodiments. It is to be understood that the invention is not limited to the above-described embodiments, and that various changes and modifications may be made by those of ordinary skill in the art without departing from the spirit and scope of the appended claims.

What is claimed is:

1. A three-dimensional measurement apparatus for measuring three-dimensional information of an object based on a light-section method, which utilizes irradiation of a light stripe on the object, the apparatus comprising:

a laser light source;

a laser light collimator adapted to collimate laser light emitted from said laser light source;

a collimated laser light stripe projection unit adapted to receive collimated laser light and to project the light stripe on the object;

a mover adapted to move said projection unit parallel to an optical axis of said collimated light, whereby the light stripe projected by said projection unit on the object is movable in a direction perpendicular to a longitudinal direction of the light stripe; and an image capture device adapted to capture images of the object viewed at a given angle with a projected light axis, the object scanned with the movement of the light stripe, whereby three-dimensional information of the object is obtained from said images, said image capture device substantially fixed with respect to the object.

2. The apparatus as claimed in claim 1, wherein said optical axis of said collimated light is perpendicular to a light receiving axis of said image capture device.

3. The apparatus as claimed in claim 1 wherein the projection unit has a cylindrical lens for creating the light stripe.

4. The apparatus as claimed in claim 3, wherein said optical axis of said collimated light is perpendicular to a light receiving axis of said image capture device.

5. The apparatus of claim 1 wherein the projection unit has a line generator lens for creating the light stripe.

6. The apparatus as claimed in claim 5, wherein said optical axis of said collimated light is perpendicular to a light receiving axis of said image capture device.

7. The apparatus as claimed in claim 1 wherein the projection unit has a galvano mirror, for deflecting said collimated light to create the light stripe.

8. The apparatus as claimed in claim 7, wherein said optical axis of said collimated light is perpendicular to a light receiving axis of said image capture device.

9. The apparatus as claimed in claim 1, wherein the laser light source is turned on to emit a single laser light pulse in accordance with a movement of said projection unit.

10. The apparatus as claimed of claim 9, wherein said optical axis of said collimated light is perpendicular to a light receiving axis of said image capture device.

11. The apparatus as claimed in claim 9 wherein the projection unit has a cylindrical lens for creating the light stripe.

12. The apparatus as claimed in claim 11, wherein said optical axis of said collimated light is perpendicular to a light receiving axis of said image capture device.

13. The apparatus of claim 9 wherein the projection unit has a line generator lens for creating the light stripe.

14. The apparatus as claimed in claim 13, wherein said optical axis of said collimated light is perpendicular to a light receiving axis of said image capture device.

15. The apparatus as claimed in claim 9 wherein the projection unit has a galvano mirror for deflecting said collimated light to create the light stripe.

16. The apparatus as claimed in claim 15, wherein said optical axis of said collimated light is perpendicular to a light receiving axis of said image capture device.

17. A three-dimensional measurement apparatus for measuring three-dimensional information of an object based on a light-section method, which uses irradiation of a stripe of light on the object, the apparatus comprising means for emitting laser light;

means for collimating laser light emitted from said emitting means;

means for projecting the stripe of light on the object;

means for moving said projecting means parallel to an optical axis of said collimated light, whereby the stripe of light projected on the object is movable in a direction perpendicular to a longitudinal direction of the stripe of light;

means for capturing images of the object viewed at a given angle with a projected light axis, the object scanned with the movement of the stripe of light, whereby three-dimensional information of the object is obtained from said images; and means for substantially fixing said image capturing means relative to the object.

18. A light-section method for measuring three-dimensional information of an object using irradiation of a light stripe on the object, comprising the steps of:

emitting laser light from a laser light source;

collimating said laser light;

projecting a collimated laser light stripe on the object from a projection unit;

moving said projection unit parallel to an optical axis of said collimated laser light, whereby said light stripe moves in a direction perpendicular to a longitudinal axis of the light stripe; and capturing images of the object with an image capture device along a light receiving axis viewed at a given angle with a projected light axis, the object scanned with the movement of the light stripe, whereby three-dimensional information of the object is obtained, and substantially fixing said image capture device relative to the object.

19. The method of claim 18 wherein said optical axis of said collimated light is perpendicular to said light receiving axis.

20. The method of claim 18 wherein the projection unit includes a cylindrical lens.

21. The method of claim 20 wherein said optical axis of said collimated light is perpendicular to said light receiving axis.

22. The method of claim 18 wherein the projection unit includes a line generator lens.

23. The method of claim 22 wherein said optical axis of said collimated light is perpendicular to said light receiving axis.

24. The method of claim 18 wherein the projection unit includes a galvano mirror, and said projecting step further comprises deflecting said collimated light from said galvano mirror.

25. The method of claim 24 wherein said optical axis of said collimated light is perpendicular to said light receiving axis.

26. The method of claim 18 wherein said emitting step includes emitting a single laser light pulse emitted in accordance with said moving step.

27. The method of claim 26 wherein said optical axis of said collimated light is perpendicular to said light receiving axis.

28. The method of claim 26 wherein the projection unit includes a cylindrical lens.

29. The method of claim 28 wherein said optical axis of said collimated light is perpendicular to said light receiving axis.

30. The method of claim 26 wherein the projection unit includes a line generator lens.

31. The method of claim 30 wherein said optical axis of said collimated light is perpendicular to said light receiving axis.

32. The method of claim 26 wherein the projection unit includes a galvano mirror, and said projecting step further comprises deflecting said collimated light from said galvano mirror.

33. The method of claim 32 wherein said optical axis of said collimated light is perpendicular to said light receiving axis.

34. The method as claimed in claim 1 wherein a plurality of light-sectioned lines constitute one frame of image taken by said image capture device.

35. The apparatus of claim 18 wherein said image capturing further includes constituting a plurality of light-sectioned lines as one frame of image.

* * * * *

UNITED STATES PATENT AND TRADEMARK OFFICE
CERTIFICATE OF CORRECTION

PATENT NO. : 6,181,424 B1
DATED : January 30, 2001
INVENTOR(S) : Okabayashi et al.

It is certified that error appears in the above-identified patent and that said Letters Patent is hereby corrected as shown below:

COLUMN 10:
Lines 8-9 (claim 34, line 8), change "method" to --apparatus--.

COLUMN 10:
Lines 11-13 (claim 35, line 11), change "apparatus" to --method--.

Signed and Sealed this

Twelfth Day of June, 2001

*Attest:*

*Nicholas P. Godici*

*Attesting Officer*

NICHOLAS P. GODICI
*Acting Director of the United States Patent and Trademark Office*